(No Model.)

J. HORNER.
NUT LOCK.

No. 511,270.  Patented Dec. 19, 1893.

Witnesses.
R. Schleicher
Alex. Barkoff

Inventor:
John Horner
by his Attorneys
Howson & Howson

UNITED STATES PATENT OFFICE.

JOHN HORNER, OF DUBOIS, PENNSYLVANIA.

NUT-LOCK.

SPECIFICATION forming part of Letters Patent No. 511,270, dated December 19, 1893.

Application filed March 21, 1892. Serial No. 425,741. (No model.)

*To all whom it may concern:*

Be it known that I, JOHN HORNER, a citizen of the United States, and a resident of Dubois, Clearfield county, Pennsylvania, have invented certain Improvements in Methods of Keying Nuts to Bolts, of which the following is a specification.

The object of my invention is to provide a simple, cheap and effective means of keying a nut to a bolt after it has been screwed up thereon, thus effectually preventing the unscrewing of the nut unless by design. This object I attain in the manner hereinafter set forth, reference being had to the accompanying drawings, in which—

Figure 1:
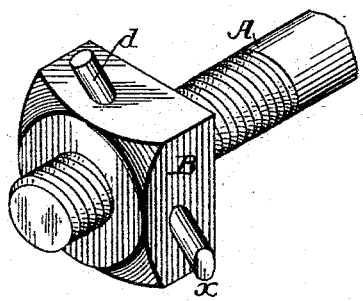
Figure 2:
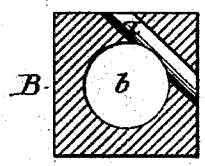
Figure 3:
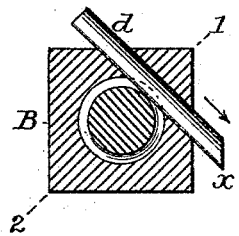
Figure 4:
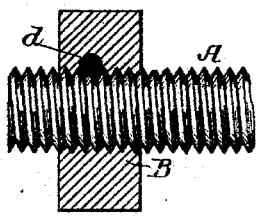

Figure 1, is a perspective view of a bolt and nut with my improved keying device applied thereto. Fig. 2, is a sectional view of the nut prepared for keying in accordance with my invention. Fig. 3, is a sectional view showing the key in place and the nut secured to the bolt; and Fig. 4, is a transverse section on the line 1—2, Fig. 3.

A represents an ordinary bolt, and B a nut which may also be of any ordinary character, that is to say, square, hexagonal, octagonal, or other shape; this nut having formed in it a transverse opening $a$, a portion of which extends into the threaded opening $b$ formed in the nut for the reception of the bolt. When the nut has been screwed up on the bolt to the desired extent a key $d$ is driven through this transverse opening, this key consisting of a steel pin the forward end of which presents a cutting edge $x$ next the bolt, said cutting edge being preferably formed by beveling the front end of the key. When the key is driven through the opening $a$ in the direction of the arrow Fig. 3, therefore, this cutting edge shears off so much of the threaded portion of the bolt as projects into the opening $a$, the key seating itself in the recess thus formed in the bolt and effectually preventing by swaging action movement of the nut in either direction until said key has been driven out.

I have shown the key opening as formed across one of the corners or angles of the nut, but it may be formed parallel with one of the flat sides of the nut if desired, the result being the same in either case.

The drilling of the opening $a$ in the nut is an operation which can be performed by machinery without the employment of skilled labor, and hence at very slight expense, and the keys $d$ can also be very cheaply produced so that the expense of the fastening is very slight, while the keying of the nut is absolute and can be very readily effected, a few taps of a hammer being sufficient to drive the key through the opening in the nut and cause it to cut its way through the thread of the bolt.

Having thus described my invention, I claim and desire to secure by Letters Patent—

The combination of a bolt, a nut having a transverse opening wholly within its body for receiving a portion of the thread of said bolt, and a key blunt in cross section having on its entering end a forwardly beveled cutting edge adapted to shear off a portion of the thread of the bolt, whereby the nut is securely locked by the swaging action of said blunt portion, substantially as described.

In testimony whereof I have signed my name to this specification in the presence of two subscribing witnesses.

JOHN HORNER.

Witnesses:
WILLIAM D. CONNER,
HARRY SMITH.